UNITED STATES PATENT OFFICE.

ADDIE L. SATTLER, OF PLAIN, WASHINGTON.

FOOD PRODUCT.

1,193,828. Specification of Letters Patent. Patented Aug. 8, 1916.

No Drawing. Application filed February 15, 1915. Serial No. 8,355.

*To all whom it may concern:*

Be it known that I, ADDIE L. SATTLER, a citizen of the United States, residing at Plain, in the county of Chelan and State of Washington, have invented certain new and useful Improvements in Food Products, of which the following is a specification.

This invention relates to food products and more particularly to a food product intended for use in the preparation of a beverage to be used as a substitute for coffee.

It is the aim of the present invention to produce a food product of the character above mentioned, the ingredients of which will not only be non-injurious to health and possess none of the injurious properties and active principles of coffee but will, on the other hand, prove highly beneficial and serve, in fact, as an aid to digestion.

Another aim of the invention is to disclose a food product of the character mentioned which will possess the agreeable aroma and taste of coffee without, as above stated, producing any of the injurious effects liable to result from the drinking of coffee.

I have discovered that carrots are highly beneficial to the digestive organs and otherwise possess tonic properties and that aside from this fact they possess, when browned and ground, an aroma and taste greatly resembling that possessed by coffee. In preparing the product embodying this invention I have also recognized and taken advantage of the health giving properties of ground whole wheat kernels.

The product of the invention consists of a mixture of browned whole wheat kernels and browned and ground carrots, and in preparing the product I mix these ingredients in the proportion of three parts of the ground wheat kernels and one part browned and ground carrots. When the ingredients are thoroughly mixed, a beverage may be prepared from the product by adding a suitable quantity thereof to cold water and allowing the same to boil gently for ten or fifteen minutes.

While any suitable quantity of the product may be added to any predetermined volume of water, I have found that the best results are secured by adding about two tablespoons full of the product to a pint of water. Also, while I have found it desirable to use the ingredients in the proportions above stated, these proportions may be varied if desired.

I am aware of the fact that it has been previously proposed to employ wheat in browned condition as a substitute for coffee both alone and in combination with other substances but so far as I am aware I am the first to have conceived the idea of preparing a coffee substitute which consists solely of a mixture of browned wheat kernels and browned and ground carrots. Furthermore, I have found that neither of these substances could be successfully employed alone as a coffee substitute but that for some reason the combination of the two substances produces a mixture which very closely resembles coffee both in taste and aroma.

Having thus described the invention, what is claimed as new is:

1. A food product for the preparation of a beverage consisting of a mixture of browned wheat kernels and browned and ground carrot.

2. A food product for the preparation of a beverage consisting of a mixture of browned wheat kernels and browned and ground carrot substantially in the proportions specified.

In testimony whereof I affix my signature in presence of two witnesses.

ADDIE L. SATTLER. [L. S.]

Witnesses:
CLARENCE A. CAMPBELL,
ROBERT B. ZANE.

Copies of this patent may be obtained for five cents each, by addressing the "Commissioner of Patents, Washington, D. C."